United States Patent
Vandergeest et al.

(10) Patent No.: US 6,732,277 B1
(45) Date of Patent: May 4, 2004

(54) METHOD AND APPARATUS FOR DYNAMICALLY ACCESSING SECURITY CREDENTIALS AND RELATED INFORMATION

(75) Inventors: Ron J. Vandergeest, Kanata (CA); Stephen W. Hillier, Ottawa (CA)

(73) Assignee: Entrust Technologies Ltd., Ontario (CA)

( * ) Notice: Subject to any disclaimer, the term of this patent is extended or adjusted under 35 U.S.C. 154(b) by 0 days.

(21) Appl. No.: 09/169,243

(22) Filed: Oct. 8, 1998

(51) Int. Cl.[7] .................................................. H04L 9/00
(52) U.S. Cl. ...................... 713/201; 713/159; 380/277
(58) Field of Search .................................. 713/200, 202, 713/153, 156, 159, 155; 380/282, 286, 277–279, 270, 247; 705/56, 64, 65, 66, 67, 71, 72, 73, 76

(56) References Cited

U.S. PATENT DOCUMENTS

| | | | | |
|---|---|---|---|---|
| 5,412,723 A | * | 5/1995 | Canetti et al. ............... | 713/155 |
| 5,745,755 A | * | 4/1998 | Covey ......................... | 707/203 |
| 6,000,033 A | * | 12/1999 | Kelley et al. ................ | 713/201 |
| 6,052,468 A | * | 4/2000 | Hillhouse .................... | 380/281 |
| 6,072,875 A | * | 6/2000 | Tsudik ......................... | 380/270 |
| 6,075,860 A | * | 6/2000 | Ketcham ..................... | 713/159 |
| 6,134,591 A | * | 10/2000 | Nickles ........................ | 709/229 |
| 6,141,758 A | * | 10/2000 | Benantar et al. ............. | 713/201 |
| 6,151,590 A | * | 11/2000 | Cordery et al. ............... | 705/60 |
| 6,154,543 A | * | 11/2000 | Baltzley ....................... | 380/255 |
| 6,199,161 B1 | * | 3/2001 | Ahvenainen ................. | 713/155 |
| 6,263,446 B1 | * | 7/2001 | Kausik et al. ............... | 713/201 |
| 6,292,895 B1 | * | 9/2001 | Baltzley ....................... | 713/168 |
| 6,373,946 B1 | * | 4/2002 | Johnston ..................... | 380/211 |
| 6,516,357 B1 | * | 2/2003 | Hamann et al. .............. | 710/2 |

FOREIGN PATENT DOCUMENTS

| | | | | |
|---|---|---|---|---|
| EP | 0936530 A1 | * | 2/1998 | ............ G06F/1/00 |
| EP | 0982692 A2 | * | 8/1999 | ............ G07F/7/10 |
| WO | WO 97/27716 | * | 7/1997 | ............ H04Q/7/38 |

* cited by examiner

Primary Examiner—Ayaz Sheikh
Assistant Examiner—Christopher Revak
(74) Attorney, Agent, or Firm—Vedder, Price, Kaufman & Kammholz, P.C.

(57) ABSTRACT

A method and apparatus for dynamically accessing security credentials that are used to participate in a secure communication begins by obtaining virtual credentials of an entity, where the virtual credentials include a data specifier and/or an identifier. The data specifier functions as a pointer to a particular physical security credential, its data storage location, and the format of the physical security credential. The identifier functions as a pointer to secondary virtual credentials, which include at least one data specifier. The processing continues by generating physical security credentials based on the physical security credentials retrieved via the data specifiers. The processing then continues by utilizing the physical security credentials by an individual entity (e.g., a party, a server, an administrator, etc.) such that the individual entity may participate in a secured communication. If, during the secured communication, any of the physical security credentials change, the physical security credentials are updated in accordance with a synchronization record to maintain data synchronization.

45 Claims, 3 Drawing Sheets

METHOD AND APPARATUS FOR DYNAMICALLY ACCESSING SECURITY CREDENTIALS AND RELATED INFORMATION

TECHNICAL FIELD OF THE INVENTION

This invention relates generally to secure transmissions of data and more particularly to dynamically obtaining security credentials to participate in a secured communication.

BACKGROUND OF THE INVENTION

Securing data for transmission may be done in a variety of ways, where the data may be digitized voice, digitized video, computer data, such as e-mail, files, programs, etc. For example, the data may be encrypted using an encryption algorithm, such as Data Encryption Standard (DES), and a symmetric key. The encrypted data is provided to a receiving party, which utilizes its own copy of the symmetric key to decrypt the encrypted message. Data transmitted in this manner provides reliable security as long as the symmetric key is only known by sending and receiving parties. As such, a key issue with symmetric key encryption is providing the symmetric key to all parties without compromising its security. Note that the security of a symmetric key is compromised when an unauthorized party has obtained it.

Another encryption process utilized public/private key pairs, which includes, for each party, a private decryption key and a public encryption key. The key pairs, or security credentials, may further include a private signature key and a public signature verification key. The public encryption key and public signature verification key are publicly available, such that a sending party may obtain the public encryption key for each targeted recipient. Once the encryption keys are obtained, the sending party individually encrypts a message using a symmetric key that is encrypted once using the public encryption keys of each recipient. When a recipient receives the encrypted message, it utilizes its private decryption key to decrypt the message. To further enhance the security of the transmission, the sending party may sign the message using its private signature key. When each recipient receives the signed message, it retrieves the public signature verification key of the sending party to authenticate the signature.

Typically, in a security network, public security credentials of the parties (e.g., public encryption keys, signature verification keys, etc.) are stored in a repository, such as a directory and/or file system. The private security credentials of the parties (e.g., the private decryption key, private signature key, etc.) are stored locally in software or hardware of each parties' computer. As such, for a user (i.e., a party) to encrypt an outgoing message, the user obtains the public security credentials of targeted recipients from the repository and accesses its private security credentials from its computer. Thus, as long as the user has access to his or her computer and the computer is coupled to the security network or offline with cached security information, the user may participate in secured communications.

As the needs for greater mobility and greater service continues to grow, encryption systems are being expanded to meet these needs. For example, a party may establish a secure communication with a predefined list of other parties (i.e., a recipient list) by identifying the group, as opposed to each recipient. As additional features are offered to a party, the party's security credentials increases in size. In some encryption systems, a party's security credentials may be distributively stored for more efficient access, requiring more sophisticated memory management techniques. As can be seen from these few examples, encryption systems are providing their users greater service options with improved service processing. A user can take advantage of these improvements provided the user can access its private security credentials and the public security credentials. As a user becomes more mobile within the encryption system, obtaining his or her private security credentials is often very difficult, thus limiting, or eliminating, the service available to a roaming user.

To provide a user with greater mobility, the user's computer may include a cryptographic service provider that interfaces with an Internet server application to retrieve security credentials from a remote key manager or database. As such, a user may obtain a private key from the key manager and store it locally and may do so at each computer in the security network the user will access. While this allows the user to roam from computer to computer within the security network, each computer needs to include a registry that stores the security credentials for the user. As one can imagine, when the same data or pieces of the data are stored in a plurality of locations, it is difficult to maintain consistency and synchronization of the data across all storage locations.

Another technique to increase the mobility of a user includes storing the user's private security credentials on a piece of hardware such as a smart card, PC card, or hardware token. For a user to roam from computer to computer in the security network, each computer must include the supporting security software and access to private security credentials of the user. As such, multiple copies of the user's private security credentials needs to be maintained or a token must be transported from each computer to the next.

Therefore, a need exists for a method and apparatus that provides dynamic access to a user's private security credentials without limiting the services available to a roaming user and without maintaining copies of the security credentials or moving a single copy.

DETAILED DESCRIPTION OF A PREFERRED EMBODIMENT

Generally, the present invention provides a method and apparatus for dynamically accessing security credentials that are used to participate in a secure communication. Such processing begins by obtaining virtual credentials of an entity, where the virtual credentials include a data specifier and/or an identifier. The data specifier functions as a pointer to a particular physical security credentials, its data storage location, and the format of the physical security credential. The data storage location may be specified as being within the data specifier itself. The format may be either explicitly specified or implied. The identifier functions as a pointer to secondary virtual credentials, which include at least one data specifier. The processing continues by generating physical security credentials based on the physical security credentials retrieved via the data specifiers. The processing then continues by utilizing the physical security credentials by an individual entity (e.g., a party, a server, an administrator, etc.) such that the individual entity may participate in a secured communication, which involves encryption, digital signature, authentication and/or other security related operations (e.g., access control). If, during the secured communication, any of the physical security credentials change, the physical security credentials are updated in accordance with a synchronization record to maintain data synchronization. With such a method and apparatus, users are provided with greater mobility and enhanced services within an encryption system. In addition, public security credentials are synchronously maintained to avoid duplication, security credentials storage requirements are reduced, a variety of encryption platforms may be supported, and security credentials updates, changes, and/or protocol migrations are supported.

Figure 1:
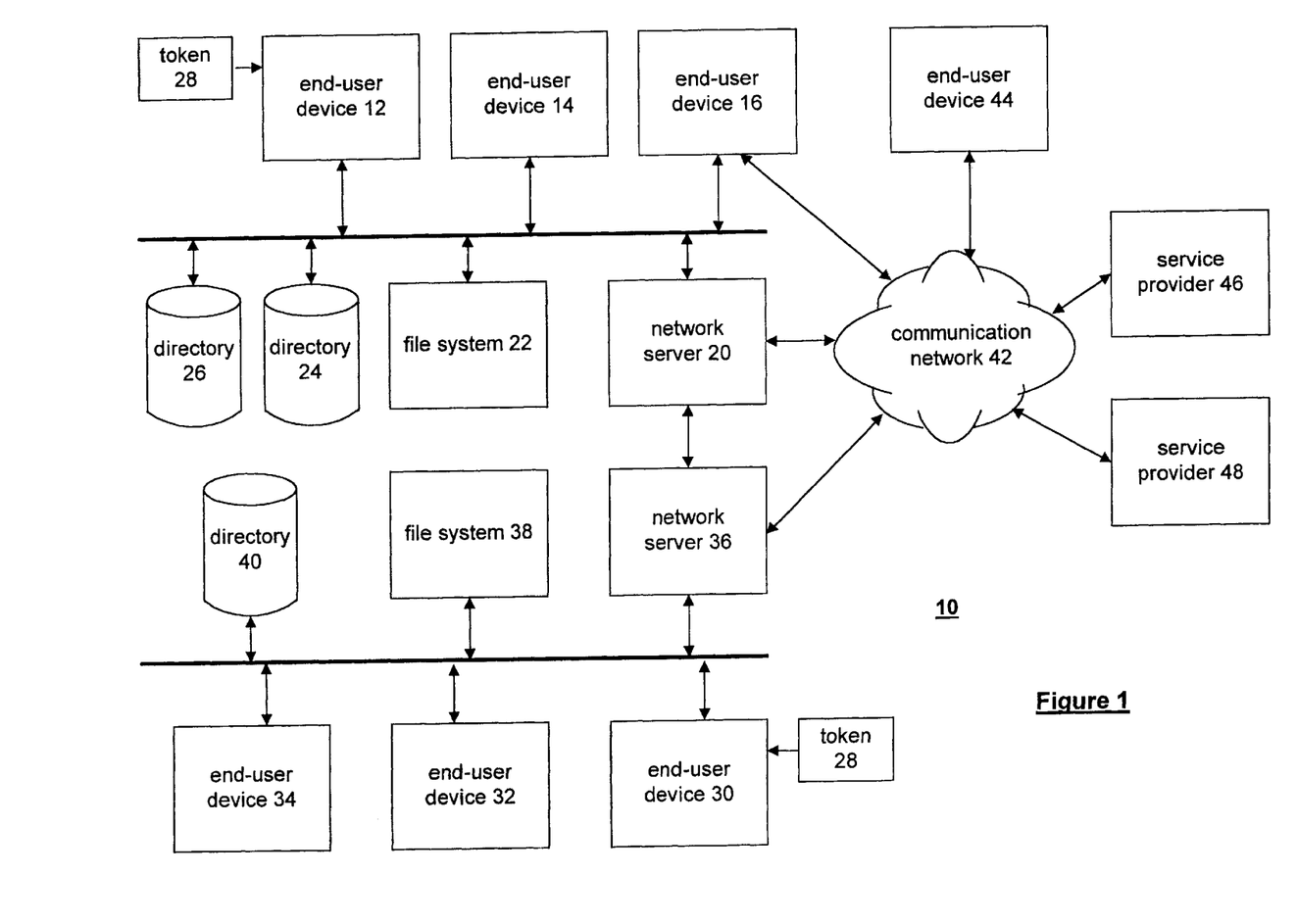
FIG. 1 illustrates a schematic block diagram of a secure communication environment in accordance with the present invention.

The present invention can be more fully described with reference to FIGS. 1 through 4. FIG. 1 illustrates a secure communication environment 10 that includes a plurality of end-user devices 12–16, 30–34 and 44, network servers 20 and 36, file systems 22 and 38, directories 24, 26 and 40, a communication network 42, and service providers 46 and 48. The network servers 20 and 36 provide network functionality for its local, or wide, area network. For example, network server 20 supports the network that includes end-user devices 12–16, file system 22 and directories 24 and 26. The network server 20 provides an interface to the communication network for the end-users, provides an interface to other networks, and may further function as a repository for group services, such as group security credentials, group accessible programs, etc. Note that network server 36 provides similar functions to the network to end-users 30–34, file system 38 and directory 40.

End user devices 12–16, 30–34 and 44, may be personal computers, work stations, hand-held computers, personal digital assistance, and/or any device that provides its user a means for communicating data. Such data communications may be digitized voice, multi-media data, compute application data, file transfers, and/or any type of data transmitted by an end-user device. The directories 24, 26 and 40 store publicly available information for their respective networks. In particular, directories 24 and/or 26 may store public security credentials of end-users 12–16, which include, but are not limited to, individual public encryption keys, individual public signature verification keys and other publicly available information regarding the end users. The file system 22 and 38 store user information such as recipient lists, group affiliations, etc. The service providers 46 and 48 may function as Internet service providers, such as key management entities, certification authorities, secure communication administrators, etc.

According to the present invention, public and private security credentials of an individual user may be stored anywhere within the secure communication environment 10. As such, a portion of the security credentials may be stored at an end-user device, within the directories, within the file system, the network server, and/or with the service providers. Note that if the private security credentials of a user are stored in a public repository (e.g., the file system, a key manager, etc.) a key exchange technique would be evoked to insure that the private security credentials are provided to the end-user device being accessed by the user.

To initiate a secure communication, a user provides a security identifier to a particular end-user device that it is accessing. The security identifier includes an identifying code associated with the user and may also include a requested function, such an encrypt data, decrypt a received message, etc. The security identifier may be provided to the end-user device being accessed by the user via a hardware token 28 and/or via a user interface of the end-user device. Upon obtaining the security identifier of the user, the end-user device via a cryptographic service provider (CSP) module, begins to generate the virtual credentials for the particular user. Once the virtual credentials are generated, they are used to obtain the physical security credentials (public and private, as needed) of the user. When the end-user device has the physical security credentials, the user may participate in a secure communication as if the user were accessing its own end-user device. Note that the token 28 is shown coupled to end-user device 12 and 30 to illustrate the mobility of the user within the communication environment 10 without the need for duplicate copies of its security credentials, without limitation as to the services the user can access, etc.

Figure 2:
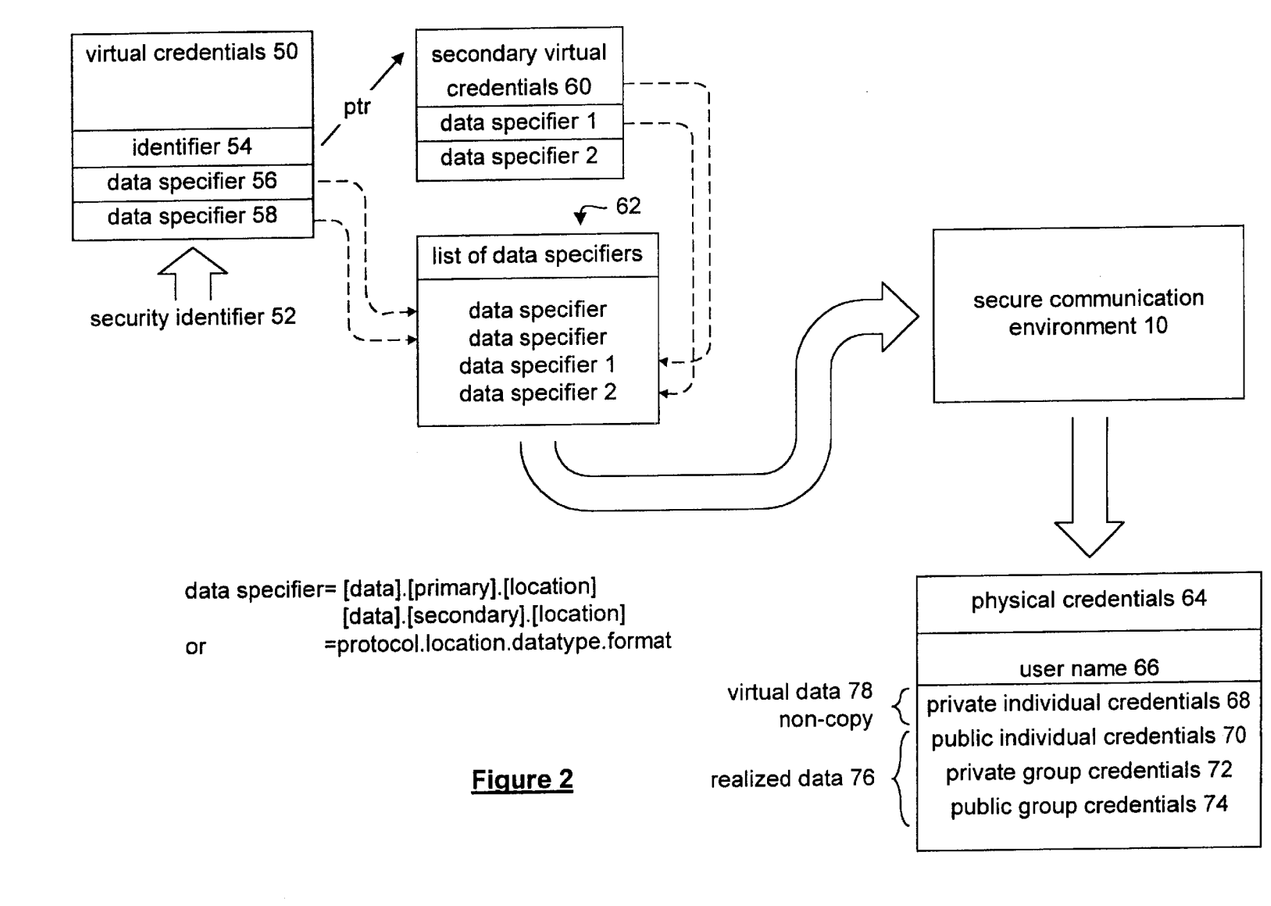
FIG. 2 illustrates a graphical representation of dynamically generating physical security credentials in accordance with the present invention.

FIG. 2 illustrates a graphical representation of generating the physical security credentials from a security identifier 52. When the CSP, which is contained within an end-user device, receives a security identifier 52, it generates the virtual credentials 50. Note that the virtual credentials 50 may be generated by accessing an encryption manager associated with the user, according the user's home end-user device, accessing a key manager, and/or by extracting the virtual credentials from the security identifier 52. The virtual credentials 50 may include identifier 54 and data specifiers 56 and 58. The data specifiers function as pointers to data storage elements (e.g., end-user device, service provider, directory, file system, network server) that contain a specific physical security credential for the identified user. The data specifier may be formatted based on the data, whether it is a primary or secondary specifier, and the particular location. Alternatively, the data specifier may be formatted based on the protocol, the location, the data type, and the format. The protocol may be a particular type of directory access such as lightweight directory access protocol (LDAP), hypertext markup language (HTML), uniform Resource locator (URL), etc. The format may specify the particular type of encryption being used, such as symmetric keying, public/private keying, DES, triple DES, etc. The data type includes whether the particular physical security credential is a private key, public key, private signature key, public signature verification key, etc.

The identifier 54 functions as a pointer to secondary virtual credentials 60. The secondary virtual credentials may include a first data specifier and a second data specifier. For example, the identifier may be referencing group virtual credentials for the particular user, while the data specifiers 56 and 58 are specific for the user. As such, by including an identifier 54 with the virtual credentials of an individual user, the secondary virtual credentials, e.g., those relating to a group, only need to be stored once.

From the data specifiers 56 and 58 and the first and second data specifiers of the second virtual credentials, a list of the data specifiers 62 is created. From the list, the cryptographic service provider accesses the data storage elements (e.g., the directories, file systems, network servers, service providers and/or end users) to obtain the physical security credentials 64 for the user. The physical security credentials 64 identify the particular user by its user name 66, and may include private individual credentials 68, public individual credentials 70, private group credentials 72, and/or public group credentials 74. The private individual credentials 68 may include a private encryption key, a private signature key, etc. The public individual credentials 70 may include a public encryption key, a public signature verification key, recipient lists, etc. The private group credentials 72 may include a private decryption key used by a group of users, a private signature key used by the group, etc. The public group credentials 74 may include an encryption key that relates to each member of the group and/or the public signature verification key.

The physical credentials 64 may also be subdivided as virtual data 78 and realized data 76. The virtual data 78 includes data that is not copied by the individual end-user device, while the realized data 76 is copied from the data storage element to the end-user device. For example, the virtual data may be stored on the token 28, which is accessed to complete the physical security credentials.

Once an end-user device has the physical security credential 64 for the requesting user, the end-user device 12 may perform the secured communication. If during the secured communication, any of the physical credentials changes (e.g., a new public/private key pair is issued, the end-user, via the CSP of the end-user device, updates the particular physical security credentials and provides the updated information to the relevant data storage element. As such during the secured communication, the physical security credentials for this particular user, and/or group, remain synchronized. Alternatively, the CSP of the end-user device may provide the updated security credentials to any of the data storage elements, which may or may not be the one that previously stored the security credentials. By reconstructing the security credentials of the user in this manner, the user may be accessing any end-user device coupled to the network without the need for duplicate copies of its security credentials. Since only a single copy of the security credentials is maintained in the system, memory requirements are reduced, synchronization of the data is provided, a variety of security platforms may be supported, and security credential updates, changes, and/or protocol migrations are supported. In addition, the reconstructed security credentials may be done based on the type of service the user has requested, thus not all of the user's security credentials need to be retrieved to fulfill the user's service request.

Figure 3:
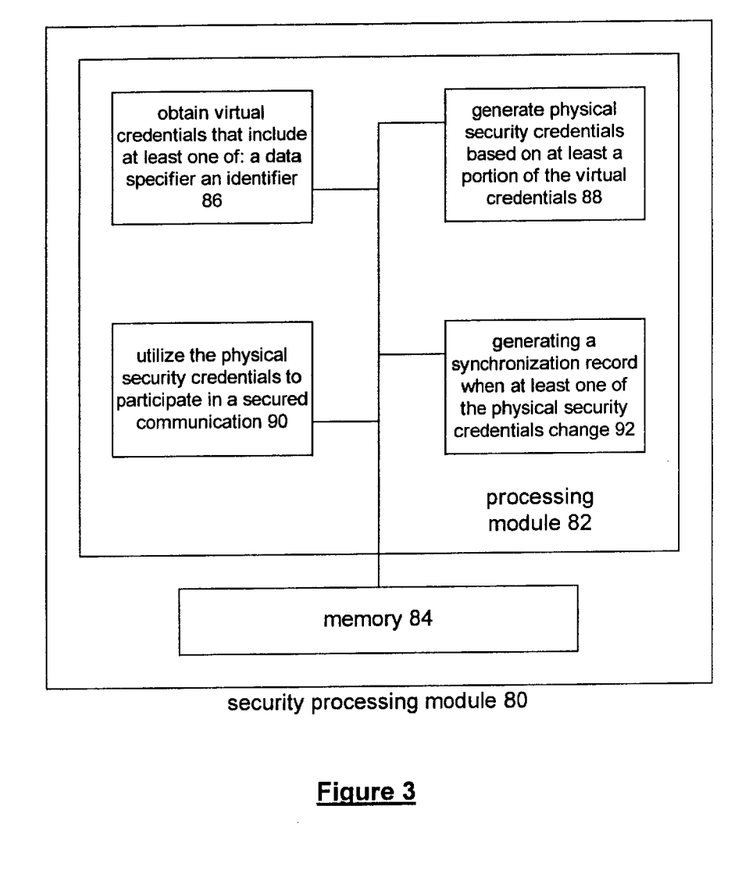
FIG. 3 illustrates a schematic block diagram of a security processing module in accordance with the present invention.

FIG. 3 illustrate a schematic block diagram of a service processing module 80, or cryptographic service processor which may be embedded in the end-users to perform the functions of the cryptographic service processor. The security processing module 80 includes a processing module 82 and memory 84. The processing module 82 may be a single processing entity or a plurality of processing entity. Such a processing entity may be a microprocessor, microcomputer, microcontroller, digital signal processor, central processing unit, state machine, logic circuitry and/or any device that manipulates data based on operating and/or programming instructions. The memory 84 may be read-only memory, random access memory, floppy disk memory, CD memory, DVD memory, hard drive memory, magnetic tape memory, system memory and/or any device that stores digital information. Note that if the processing module 82 has one or more of its functions performed by a state machine, the memory storing the associated operating instructions would be embedded within the state machine.

Memory 84 stores operating instructions that cause the processing module to function as a plurality of circuits 86–92. While performing the operating instructions, the processing module functions as circuit 86 to obtain virtual credentials for a particular user that includes at least one of a data specifier and an identifier. The processing module then functions as circuit 88 to generate physical security credentials based on at least a portion of the virtual credentials. The processing module then functions as circuit 90 to utilize the physical security credentials to participate in a secured communication. The processing module then functions as circuit 92 to generate a synchronization record when at least one of the physical security credentials change. The operating instructions stored in memory 84 and executed by the processing module 82 will be discussed in greater detail with reference to FIG. 4.

Figure 4:
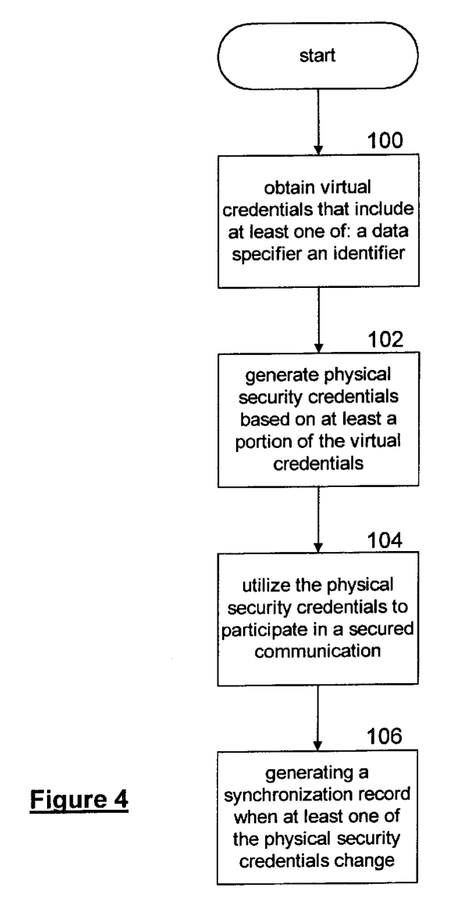
FIG. 4 illustrates a logic diagram of a method for dynamically accessing security credentials in accordance with the present invention.

FIG. 4 illustrates a logic diagram for dynamically generating security credentials for a user. The process begins at step 100 where virtual credentials are obtained. The virtual credentials include at least one of a data specifier and an identifier. The virtual credentials may be obtained upon the initialization of a secured communication by an end-user, or by interpreting a token. Virtual credentials may be retrieved from a local computer (e.g., an end-user device), a network server, a hardware token, and/or via an internet connection. The impetus for obtaining the virtual credentials may be based on receiving a security identifier that identifies an individual entity. The individual entity may be a user, an end-user device, a machine, and/or a group of at least one user and/or machine.

The process then proceeds to step 102 where physical security credentials are generated based on at least a portion of virtual credentials. Such physical security credentials include individual security credentials and shared security credentials. The individual and/or shared security credentials may be in themselves protected or unprotected. If they are protected, they may be protected based on a particular encryption process. The physical security credentials are determined based on the data specifier, which includes at least one of a data type identifier, a primary or secondary identifier, a protocol identifier, a location identifier, a format identifier, and an identifier that a data specifier is not available. Data specifiers were discussed in greater detail with FIGS. 1 and 2.

The process then proceeds to step 104 where the physical security credentials are utilized to participate in a secured communication. The process then proceeds to step 106 where a synchronization record is generated when at least one of the physical security credentials change. This may be done by pushing an updated representation of at least one of the physical security credentials to one of the data elements that previously stored the security credential, or to a new data storage element. In addition, the synchronization record may be stored for subsequent updating of the data storage element or another data storage element. The synchronization record may be a data record indicating time of last data change, which could be used to allow maintenance of caching mechanism. Further, the synchronization record includes an indicator that indicates to other applications that appropriate parts of the physical security credentials are to be re-assembled.

The preceding discussion has presented a method and apparatus for dynamically generating physical security credentials for a user regardless of where the user is within a secure communication environment. By utilizing such a method and apparatus, duplicate copies of public information is avoided since it is stored in a single data storage location, thereby minimizing system level storage requirements. In addition, is capable of supporting a variety of platforms and/or systems such that no local disks are required for the particular end-user device. Further, the secure communication environment supports easy migration to different protocols and/or security systems since the security credentials are compiled when needed.

What is claimed is:

1. A method for dynamically accessing security credentials that are used for participating in a secure communication, the method comprises the steps of:
   a) obtaining virtual credentials associated with a source that does not contain physical security credentials of interest, that include at least one of a data specifier and an identifier;
   b) generating, by other than the source, physical security credentials used to participate in a secured communication based on at least a portion of the virtual credentials; and
   c) utilizing the physical security credentials to participate in the secured communication.

2. The method of claim 1 further comprises generating a synchronization record when at least one of the physical security credentials changed, wherein the synchronization record includes an indicator that indicates to other applications that appropriate parts of the physical security credentials are to be re-assembled.

3. The method of claim 2 further comprises at least one of:
   pushing an updated representation of the at least one of the physical security credentials to a data storage element; and
   storing the synchronization record for subsequent updating of a data storage element.

4. The method of claim 1, wherein step (a) further comprises retrieving the virtual credentials from at least one of: a local computer, a network server database, a hardware token, and an Internet connection.

5. The method of claim 1 further comprises generating the virtual credentials upon initialization of secure communication privileges.

6. The method of claim 1 further comprises:
   receiving a security identifier that identifies an individual entity, wherein the obtaining of the virtual credentials is based on the security identifier, wherein the individual entity includes a user, a machine software process, and a group of at least one of users and machine software processes.

7. The method of claim 1, wherein the physical security credentials include individual security credentials and shared security credentials and wherein the security credentials are unprotected or protected.

8. The method of claim 1, wherein step (b) further comprises generating the physical security credentials based on the data specifiers and wherein the data specifier includes at least one of: data type identifier, a primary/secondary identifier, a protocol identifier, a location identifier, a format identifier, and an identifier that the data specifiers are not available.

9. The method of claim 1, wherein the physical security credentials include realized data and virtual data, wherein the virtual data references non-copy physical security credentials.

10. The method of claim 1 further comprises accessing secondary virtual credentials based on the identifier to obtain at least one secondary data specifier.

11. A method for dynamically accessing security credentials that are used for participating in a secure communication, the method comprises the steps of:
   a) receiving a security identifier that identifies an individual entity;
   b) obtaining virtual credentials, associated with a source that does not contain physical security credentials of interest, based on the security identifier, wherein the virtual credentials include at least one of: a data specifier and an identifier;
   c) generating physical security credentials, other than by the source used to participate in a secured communication based on at least a portion of the virtual credentials.

12. The method of claim 11 further comprises:
   utilizing the physical security credentials to participate in the secured communication; and
   generating a synchronization record when at least one of the physical security credentials changed during the second communication.

13. The method of claim 12 further comprises generating the synchronization record by at least one of:
   pushing an updated representation of the at least one of the physical security credentials to a data storage element; and
   storing the synchronization record for subsequent updating of a data storage element.

14. The method of claim 11, wherein step (b) further comprises retrieving the virtual credentials from at least one of: a local computer, a network server, a hardware token, and an Internet connection.

15. The method of claim 11, wherein step (c) further comprises generating the physical security credentials based on the data specifiers having a secondary identifier when the physical security credentials of the data specifiers having a primary identifier that is not available.

16. The method of claim 11 further comprises accessing secondary virtual credentials based on the identifier to obtain at least one secondary data specifier.

17. A security processing module comprises;
   a processing module; and
   memory operably coupled to the processing module, wherein the memory stores programming instructions that, when read by the processing module, cause the processing module to: (a) obtain virtual credentials, associated with a source that does not contain physical security credentials of interest, that include at least one of: a data specifier and an identifier; (b) generate physical security credentials used to participate in a secure communication based on at least a portion of the virtual credentials; and (c) utilize the physical security credentials to participate in the secured communication.

18. The security processing module of claim 17, wherein the memory further comprises programming instructions that cause the processing module to generate a synchronization record when at least one of the physical security credentials changed, wherein the synchronization record includes an indicator that indicates to other applications that appropriate parts of the physical security credentials are to be reassembled.

19. The security processing module of claim 18, wherein the memory further comprises programming instructions that cause the processing module to generate the synchronization record by at least one of:
   pushing an updated representation of the at least one of the physical security credentials to a data storage element; and
   storing the synchronization record for subsequent updating of a data storage element.

20. The security processing module of claim 17, wherein the memory further comprises programming instructions that cause the processing module to:
  receive a security identifier that identifies an individual entity, wherein the obtaining of the virtual credentials is based on the security identifier.

21. The security processing module of claim 17, wherein the memory further comprises programming instructions that cause the processing module to retrieve the virtual credentials from at least one of: a local computer, a network server database, a hardware token, and an Internet connection.

22. The security processing module of claim 17, wherein the memory further comprises programming instructions that cause the processing module to generate the physical security credentials based on the data specifiers having a secondary identifier when the physical security credentials of the data specifiers having a primary identifier are not available.

23. The security processing module of claim 17, wherein the memory further comprises programming instructions that cause the processing module to access secondary virtual credentials based on the identifier to obtain at least one secondary data specifier.

24. A digital storage medium that stores programming instructions that, when read by a processing module, cause the processing module to dynamically access security credentials, the digital storage medium comprises:
  first storage means for storing programming instruction that cause the processing module to obtain virtual credentials, associated with a source that does not contain physical credentials of interest, that include at least one of: a data specifier and an identifier;
  second storage means for storing programming instruction that cause the processing module to generate physical security credentials used to participate in a secured communication based on at least a portion of the virtual credentials; and
  third storage means for storing programming instruction that cause the processing module to utilize the physical security credentials to participate in the secured communication.

25. The digital storage medium of claim 24 further comprises programming instructions that cause the processing module to generate a synchronization record when at least one of the physical security credentials changed, wherein the synchronization record includes an indicator that indicates to other applications that appropriate parts of the physical security credentials are to be re-assembled.

26. The digital storage medium of claim 25 further comprises programming instructions that cause the processing module to generate the synchronization record by at least one of:
  pushing an updated representation of the at least one of the physical security credentials to a data storage element; and
  storing the synchronization record for subsequent updating of a data storage element.

27. The digital storage medium of claim 24 further comprises programming instructions that cause the processing module to:
  receive a security identifier that identifies an individual entity, wherein the obtaining of the virtual credentials is based on the security identifier.

28. The digital storage medium of claim 24 further comprises programming instructions that cause the processing module retrieve the virtual credentials from at least one of: a local computer, a network server database, a hardware token, and an Internet connection.

29. The digital storage medium of claim 24 further comprises programming instructions that cause the processing module to generate the physical security credentials based on the data specifiers having a secondary identifier when the physical security credentials of the data specifiers having a primary identifier are not available.

30. The digital storage medium of claim 24 further comprises programming instructions that cause the processing module to access secondary virtual credentials based on the identifier to obtain at least one secondary data specifier.

31. A digital storage medium that stores programming instructions that, when read by a processing module, cause the processing module to dynamically access security credentials, the digital storage medium comprises:
  first storage means for storing programming instruction that cause the processing module to receive a security identifier that identifies an individual entity;
  second storage means for storing programming instruction that cause the processing module to obtain virtual credentials, associated with a source that does not contain physical security credentials of interest, based on the security identifier, wherein the virtual credentials include at least one of: a data specifier and an identifier;
  third storage means for storing programming instruction that cause the processing module to generate physical security credentials used to participate in a secured communication based on at least a portion of the virtual credentials.

32. The digital storage medium of claim 31 further comprises programming instructions that cause the processing module to:
  utilize the physical security credentials to participate in the secured communication; and
  generate a synchronization record when at least one of the physical security credentials changed during the secured communication.

33. The digital storage medium of claim 31 further comprises programming instructions that cause the processing module to generate the synchronization record by at least one of:
  pushing an updated representation of the at least one of the physical security credentials to a data storage element; and
  storing the synchronization record for subsequent updating of a data storage element.

34. The digital storage medium of claim 31 further comprises programming instructions that cause the processing module to retrieve the virtual credentials from at least one of: a local computer, a network server, a hardware token, and an Internet connection.

35. The digital storage medium of claim 31 further comprises programming instructions that cause the processing module to generate the physical security credentials based on the data specifiers having a secondary identifier when the physical security credentials of the data specifiers having a primary identifier are not available.

36. The digital storage medium of claim 31 further comprises programming instructions that cause the processing module to access secondary virtual credentials based on the identifier to obtain at least one secondary data specifier.

37. A method for dynamically accessing security credentials that are used for participating in a secure communication, the method comprises the steps of:

a) obtaining virtual credentials, associated with a source that does not contain physical credentials of interest, that include at least one of a data specifier and an identifier;

b) generating, by other than the source, physical security credentials used to participate in a secured communication based on at least a portion of the virtual credentials;

c) utilizing the physical security credentials to participate in the secured communication; and d) accessing secondary virtual credentials based on the identifier to obtain at least one secondary data specifier.

38. A method for dynamically accessing security credentials that are used for participating in a secure communication, the method comprises the steps of:

a) receiving a security identifier that identifies an individual entity;

b) obtaining virtual credentials, associated with a source that does not contain physical credentials of interest, based on the security identifier, wherein the virtual credentials include at least one of: a data specifier and an identifier;

c) generating physical security credentials, other than by the source used to participate in a secured communication based on at least a portion of the virtual credentials; and d) generating the physical security credentials based on the data specifiers having a secondary identifier when the physical security credentials of the data specifiers having a primary identifier is not available.

39. A method for dynamically accessing security credentials that are used for participating in a secure communication, the method comprises the steps of:

a) receiving a security identifier that identifies an individual entity;

b) obtaining virtual credentials, associated with a source that does not contain physical credentials of interest, based on the security identifier, wherein the virtual credentials include at least one of: a data specifier and an identifier;

c) generating physical security credentials, other than by the source used to participate in a secured communication based on at least a portion of the virtual credentials; and d) accessing secondary virtual credentials based on the identifier to obtain to least one secondary data specifier.

40. A security processing module comprises;

a processing module; and memory operably coupled to the processing module, wherein the memory stores programming instructions that, when read by the processing module, cause the processing module to: (a) obtain virtual credentials, associated with a source that does not contain physical credentials of interest, that include at least one of: a data specifier and an identifier; (b) generate physical security credentials used to participate in a secure communication based on at least a portion of the virtual credentials; (c) utilize the physical security credentials to participate in the secured communication; and (g) generate the physical security credentials based on the data specifiers having a second identifier when the physical security credentials of the data specifiers having a primary identifier are not available.

41. A security processing module comprises;

a processing module; and memory operably coupled to the processing module, wherein the memory stores programming instructions that, when read by the processing module, cause the processing module to: (a) obtain virtual credentials, associated with a source that does not contain physical credentials of interest, that include at least one of: a data specifier and an identifier; (b) generate physical security credentials used to participate in a secure communication based on at least a portion of the virtual credentials; (c) utilize the physical security credentials to participate in the secured communication; and (d) access secondary virtual credentials based on the identifier to obtain at least one secondary data specifier.

42. A digital storage medium that stores programming instructions that, when read by a processing module, cause the processing module to dynamically access security credentials, the digital storage medium comprises:

first storage means for storing programming instruction that cause the processing module to obtain virtual credentials associated with a source that does not contain physical credentials of interest, that include at least one of: a data specifier and an identifier;

second stage means for storing programming instruction that cause the processing module to generate physical security credentials used to participate in a secured communication based on at least a portion of the virtual credentials;

third storage means for storing programming instruction that cause the processing module to utilize the physical security credentials to participate in the secured communication; and programming instructions that cause the processing module to generate the physical security credentials based on the data specifiers having a secondary identifier when the physical security credentials of the data specifiers having a primary identifier are not available.

43. A digital storage medium that stores programming instructions that, when read by a processing module, cause the processing module to dynamically access security credentials, the digital storage medium comprises:

first storage means for storing programming instruction that cause the processing module to obtain virtual credentials, associated with a source that does not contain physical credentials of interest, that include at least one of: a data specifier and an identifier;

second storage means for storing programming instruction that cause the processing module to generate physical security credentials used to participate in a secured communication based on at least a portion of the virtual credentials;

third storage means for storing programming instruction that cause the processing module to utilize the physical security credentials to participate in the secured communication; and fourth storage means for storing programming instructions that cause the processing module to access secondary virtual credentials based on the identifier to obtain at least one secondary data specifier.

44. A digital storage medium that stores programming instructions that, when read by a processing module, cause the processing module to dynamically access security credentials, the digital storage medium comprises:

first storage means for storing programming instruction that cause the processing module to receive a security identifier that identifies an individual entity;

second storage means for storing programming instruction that cause the processing module to obtain virtual credentials, associated with a source that does not contain physical credentials of interest, based on the security identifier, wherein the virtual credentials include at least one of: a data specifier and an identifier;

third storage means for storing programming instruction that cause the processing module to generate physical security credentials used to participate in a secured communication based on at least a portion of the virtual credentials; and fourth storage means for storing programming instructions that cause the processing module to generate the physical security credentials based on the data specifiers having a secondary identifier when the physical security credentials of the data specifiers having a primary identifier are not available.

45. A digital storage medium that stores programming instructions that, when read by a processing module, cause the processing module to dynamically access security credentials, the digital storage medium comprises:

first storage means for storing programming instruction that cause the processing module to receive a security identifier that identifies an individual entity;

second storage means for storing programming instruction that cause the processing module to obtain virtual credentials, associated with a source that does not contain physical credentials of interest, based on the security identifier, wherein the virtual credentials include at least one of: a data specifier and an identifier;

third storage means for storing programming instruction that cause the processing module to generate physical security credentials used to participate in a secured communication based on at least a portion of the virtual credentials; and fourth storage means for programming instructions that cause the processing module to access secondary virtual credentials based on the identifier to obtain at least one secondary data specifier.

* * * * *